Dec. 3, 1935.    G. HEYMER    2,022,768
PROCESS OF PRINTING COPIES FROM A LENTICULAR FILM
Filed Oct. 3, 1932
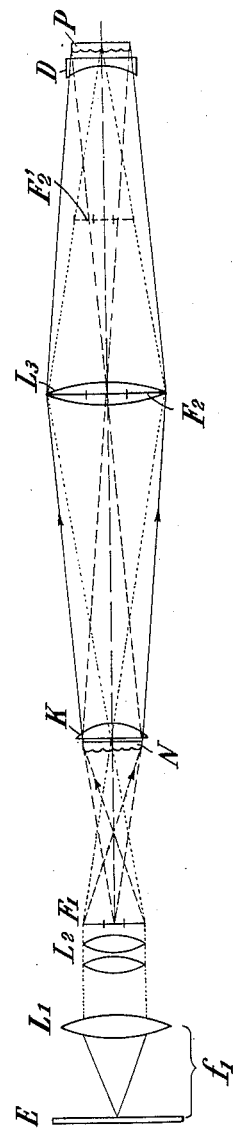
Inventor:
Gerd Heymer,
By   Attorney
Philip S. Hopkins.

Patented Dec. 3, 1935

2,022,768

UNITED STATES PATENT OFFICE 2,022,768

PROCESS OF PRINTING COPIES FROM A LENTICULAR FILM

Gerd Heymer, Dessau-Ziebigk, Germany, assignor to Agfa Ansco Corporation, Binghamton, N. Y., a corporation of New York Application October 3, 1932, Serial No. 636,056
In Germany October 6, 1931

6 Claims. (Cl. 88—24)

In my U. S. Patent No. 1,915,418, granted June 27, 1933, I have already described a process of printing lenticular films, however the course of the beams of light in the arrangement disclosed in that specfication necessitates objectives of particularly great aperture, especially so when objectives of large apertures have been used in taking the film. For correct reproduction of the tonal values the printing objectives must have the property that even the rays of greatest divergence, namely those which pass from one corner of the filter to the opposite corner of the gate aperture, are not masked. In many cases the usual objectives do not comply with these requirements.

This invention is based on the observation that, apart from the application of an objective of great light-transmitting capacity, it is necessary to condense the beams of light, by optical means, in the printing operation. For this purpose there is disposed in the closest proximity possible to the gate aperture behind which the negative film passes a lens which projects a real image of the filter or of a diaphragm substituted therefor, or of a source of light such as is described, for instance, in the above mentioned U. S. Patent No. 1,915,418, having a suitable form, on the optical system by which the negative is projected on to the positive film layer.

The arrangement described is analogous to that shown in Fig. 1 of my aforesaid U. S. Patent No. 1,915,418 and is derived from the latter by placing the lens $L_3$ as close as possible to the film N to be printed while simultaneously shortening its focal length, that is to say, the lens $L_3$ of the patent becomes the lens K of the present invention. The lens $L_3$ of the present invention, which results from the lens $L_4$ of the aforesaid patent has the function of projecting the film N. It is preferable for the purposes of this invention that the projection ($F_2$) lies within that plane of the filter determined by the narrowest optically effective section of the objective corresponding to the plane of the diaphragm in photographic objectives. As, in general the injurious vignettation of an objective diminishes with its focal length it is advisable to use a printing objective of long focal length.

In order to render more clear the principle of my invention an arrangement for printing according to my invention will be described with reference to the accompanying drawing, showing diagrammatically the way of the light rays in printing according to this invention. It is, however, to be understood that this arrangement is only given to illustrate the invention without limiting it thereto.

The figure shows a luminous plane E which is arranged in the focus of a condenser $L_1$ of the focal length $f_1$. The rays emanating from plane E which, for instance, may be an illuminated disc of opaque glass travel parallel to one another to the objective $L_2$ being equal in function to the objective by means of which the negative film was originally exposed (the term "equal in function" is to be understood in the same sense as in my co-pending application Ser. No. 450,238, filed May 6, 1930 now matured into Patent No. 1,874,-529). By means of the lenses $L_1$ and $L_2$ the luminous plane E is projected onto the negative film through the filter $F_1$. Each point of E will therefore appear in the focal plane of the objective $L_2$ in which the negative film N is placed, that is to say in a plane conjugate to the plane in which the illuminated disk E is placed. The filter $F_1$ must correspond with regard to its distance from the objective and its size to the multi-color filter or its virtual image used in taking the negative. This arrangement E—$L_1$—$L_2$—$F_1$ can be replaced, for instance, by the illuminating device described in my co-pending application Ser. No. 634,073, filed Sept. 20, 1932. In close proximity to the gate aperture behind which the negative film passes, there is disposed a lens K which projects a real image of the filter $F_1$ between the negative film N and the positive film P to be printed. $L_3$ designates an optical system which projects the negative film N onto the positive film P. This optical system may be one of the known objectives as usual in optically printing. In order to obtain a sufficient aperture there can also be used two symmetrically constructed objectives. The focal length of the lens K is so selected that the real image $F_2$ of the filter $F_1$ is projected at the place where the beams of light have in the printing objective their narrowest section; in the figure this place is the mounting of $L_3$. When viewed from the positive film P the real image $F_2$ of the filter has a certain size and is at a certain distance from P. As this distance is generally different from that desired in the projection of the printed film there is provided at D another optical system. The positive or negative focal length of this system which in the figure corresponds to $F_2'P$ may vary in such a manner that the corresponding position of the virtual filter image varies from ∞ to any position near P. It is selected according to the distance at which the multi-color filter is to be disposed from the film in projection. The drawing illustrates the arrangement when the multi-color filter is to have in projection the same distance from the lenticular film as in taking the film. In this arrangement there is inserted near P the diverging-lens D which projects a virtual image F₂' of the multicolor filter at the same distance from the film as that of the multi-color filter or its virtual image from the negative film during the taking.

For eliminating faults in the projection which would deteriorate the sharpness of the picture it is preferred to correct the objective L₃, which effects the projection proper, together with the converging lens K and the optical system D as a uniform system.

What I claim is:

1. A process of printing without lateral inversion a lenticular negative film onto another lenticular film destined for the positive picture which comprises illuminating the negative film through the refracting surface under optical conditions corresponding with those in taking, condensing the beam of light emanating from the negative film by means of a converging lens or lens system, and projecting in front of the positive film an image of the plane corresponding to that which in the original exposure contained the multicolor filter or the virtual image thereof at the same distance from the film as the multicolor filter shall have in projecting the printed film while simultaneously projecting the negative film onto the positive film.

2. A process of printing without lateral inversion a lenticular negative film onto another lenticular film destined for the positive picture which comprises illuminating the negative film through the refracting surface under optical conditions corresponding with those in taking, condensing the beam of light emanating from the negative film by means of a converging lens or lens system while simultaneously projecting a real image of the plane corresponding to that which in the original exposure contained the multi-color filter or the virtual image thereof at the narrowest optically effective section of the printing objective, and projecting the negative film onto the positive film while producing an image of said real image at the same distance from the positive film as the multicolor filter shall have in projecting the printed film.

3. An apparatus for printing without lateral inversion a lenticular film onto another lenticular film destined for the positive picture which comprises in combination a negative film, an illuminating device arranged such that its distance and aperture when viewed from the negative film, correspond with the position of the multicolor filter or its virtual image in taking, a positive film arranged at a substantial distance from said negative film, a converging lens or lens system arranged in close proximity to said negative film, for condensing the beam of light emanating from the negative film, an optical system inserted between said negative film and said positive film and adapted to project an image of said illuminating device at the same distance from the positive film as the multicolor filter shall have in projecting the printed film while simultaneously projecting the negative film onto the positive film.

4. An apparatus for printing without lateral inversion a lenticular film onto another lenticular film destined for the positive picture which comprises in combination a negative film, an illuminating device arranged such that its distance and aperture when viewed from the negative film, correspond with the position of the multi-color filter or its virtual image in taking, a positive film arranged at a substantial distance from said negative film, an optical system inserted between said negative and said positive film and a converging lens or lens system arranged in close proximity to said negative film, for condensing the beam of light emanating from the negative film and projecting a real image of said illuminating device at the narrowest optically effective section of said optical system, said optical system being adapted to project an image of said illuminating device at the same distance from the positive film as the multi-color filter shall have in projecting the printed film while simultaneously projecting the negative film onto the positive film.

5. An apparatus for printing without lateral inversion a lenticular film onto another lenticular film destined for the positive picture which comprises in combination a negative film, an illuminating device arranged such that its distance and aperture when viewed from the negative film, correspond with the position of the multicolor filter or its virtual image in taking, a positive film arranged at a substantial distance from said negative film, a first optical system inserted between said negative film and said positive film and adapted to project said negative film onto said positive film, a converging lens or lens system arranged in close proximity to the negative film for condensing the beam of light emanating from said negative film and projecting a real image of said illuminating device at the narrowest optically effective section of said first optical system, and a second optical system inserted between said first optical system and the positive film adapted to produce an image of said illuminating device at the same distance as the multicolor filter shall have in projecting the printed film.

6. A process of printing without lateral inversion a lenticular negative film onto another lenticular film destined for the positive picture, which comprises illuminating the negative film through the refracting surface under optical conditions corresponding with those in taking, condensing the beam of light emanating from the negative film by means of a converging lens or lens system, and projecting in front of the positive film and compensating for the displacement of the filter image by said converging lens or lens system, an image of the plane corresponding to that which in the original exposure contained the multicolor filter or the virtual image thereof at the same distance from the film as the multi-color filter shall have in projecting the printed film, while simultaneously projecting the negative film onto the positive film.

GERD HEYMER.